(12) United States Patent
Pinckney et al.

(10) Patent No.: US 7,410,921 B2
(45) Date of Patent: *Aug. 12, 2008

(54) HIGH THERMAL EXPANSION CYCLOSILICATE GLASS-CERAMICS

(75) Inventors: Linda Ruth Pinckney, Corning, NY (US); Steven Alvin Tietje, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/708,242

(22) Filed: Feb. 20, 2007

(65) Prior Publication Data

US 2007/0238601 A1 Oct. 11, 2007

Related U.S. Application Data

(63) Continuation-in-part of application No. 11/402,761, filed on Apr. 11, 2006, now Pat. No. 7,378,361, and a continuation-in-part of application No. 11/546,237, filed on Oct. 11, 2006.

(51) Int. Cl.
*C03C 10/04* (2006.01)
*C03C 8/24* (2006.01)

(52) U.S. Cl. .......................... 501/5; 501/15; 501/21; 501/26

(58) Field of Classification Search .............. 501/5, 501/8, 9, 15, 21, 26
See application file for complete search history.

(56) References Cited

U.S. PATENT DOCUMENTS

| | | | |
|---|---|---|---|
| 5,298,332 A | 3/1994 | Andrus et al. | 428/469 |
| 6,430,966 B1 * | 8/2002 | Meinhardt et al. | 65/43 |
| 6,532,769 B1 * | 3/2003 | Meinhardt et al. | 65/33.5 |
| 7,214,441 B2 * | 5/2007 | Cortright et al. | 429/35 |

FOREIGN PATENT DOCUMENTS

JP 2000-86288 * 3/2000

OTHER PUBLICATIONS

"*Glass-forming ability, sinterability and thermal properties in the systems RO-BaO-SiO$_2$ (R=Mg, Zn*")", C. Lara, J. Non-Crystalline Solids, 348, 2004 149-155.
"*Thick Film heaters made From Dielectric Tape Bonded Stainless Steel Substrates,*" S.J. Stein, et al Electro Science Laboratories Inc. 1995.
"On the crystal structure of pseudowollastonite (*CaSiO$_3$*)", H. Yang. American Mineralogist, V. 84, pp. 929-932, no date.
"The Structure and Polytypes of a-CaSio$_3$ (*Pseudowollastonie*)", T. Yamanaka, et al Acta Cryst. (1981), B37, 1010-1017.
"*Structure and High-Pressure Polymorphismof Strontium Metasilicate,*" K. Machinda, Acta Cryst. (1982), B38, 386-389.
"*Properties and Structure of Viterous Silica.I*", R. Bruckner, J. of Non-Crystalline Solids 5 (1970) 123-175.
"Studies In the System CaO-Al$_2$O$_3$-SiO$_2$-H$_2$O, II: The Stystem CaSiO$_3$-H$_2$O", Buckner, et al *American Journal of Science*, New Haven Connecticut, 1960, vol. 258 pp. 132-147.
"Crystallographic study of Ca$_2$BaSi$_3$O$_9$", *Zeitschrift Fur Kristallographie*, Frankfurt Am main (1961) Bd. 116, S. 263-265.
"Thermal Expansion", *Handbood of Physical Constants*, The Gological Society of American memoir 97, 1966 Section 6, 76-96.
"Glass/Metal and Glass-Ceramic/metal Seals", *Engineered Materials Handbook*, vol. 4, Tomsia, et al 493-501, no date.

* cited by examiner

*Primary Examiner*—Karl E Group
(74) *Attorney, Agent, or Firm*—Walter M. Douglas

(57) ABSTRACT

The invention is directed to highly crystalline, frit-sintered glass-ceramic compositions having a coefficient of thermal expansion in the range of 85-115×10$^{-7}$° C. The primary crystal phases of the glass-ceramics of the invention possess a cyclosilicate structure. The glass-ceramic of the invention are useful as metal-to-metal, metal-to-ceramic and ceramic-to-ceramic sealing agents, and also as high-performance coating for metals and ceramics. In their broadest composition the glass-ceramic contain, in weight percent, 30-55% SiO$_2$, 5-40% CaO, 0-50% BaO, 0.1-10% Al$_2$O$_3$, and 0-40% SrO, wherein the sum of CaO+BaO+SrO is in the range of 35-65 wt. %. Optionally, the glass-ceramic compositions may contain at least one from the group of >0-15 wt. % MgO and >0-10 wt. % ZnO. Also optionally, the glass ceramic compositions may contain >0-10 wt. % of at least one transition metal or rare earth metal oxide.

17 Claims, 4 Drawing Sheets

HIGH THERMAL EXPANSION CYCLOSILICATE GLASS-CERAMICS

PRIORITY

This application is a continuation-in-part claiming the priority of: (1) U.S. application Ser. No. 11/402,761, filed Apr. 11, 2006, now U.S. Pat. No. 7,378,361 titled HIGH THERMAL EXPANSION CYCLOSILICATE GLASS-CERAMICS; and (2) U.S. application Ser. No. 11/546,237, filed Oct. 11, 2006, titled GLASS-CERAMIC SEALS FOR USE IN SOLID OXIDE FUEL CELLS.

FIELD OF THE INVENTION

The invention is directed to highly crystallized, frit-sintered glass-ceramics in which the primary crystal phases possess cyclosilicate crystal structures. The materials can be used as metal-to-metal, metal-to-ceramic and ceramic-to-ceramic sealing materials as well as high performance coatings for metals and ceramics.

BACKGROUND OF THE INVENTION

Glass-ceramics are polycrystalline materials formed by controlled crystallization of a precursor glass article. A glass-ceramic may be prepared by exposing a glass monolith to a thermal treatment for conversion to a crystalline state. This is referred to as "internal nucleation" or a "bulk" or "monolith glass-ceramic forming process."

Glass-ceramics may also be prepared by firing glass frits in what is referred to as powder processing methods. A glass is reduced to a powder state, formed to a desired shape, fired and crystallized to a glass-ceramic state. In this process, the relict surfaces of the glass grains serve as nucleating sites for the crystal phases. The glass composition, particle size, and processing conditions are chosen such that the glass softens prior to crystallization and undergoes viscous sintering to maximum density just before the crystallization process is completed. Shape forming methods may include but are not limited to extrusion, slip casting, tape casting, spray drying, and isostatic pressing.

Sintered glass-ceramic materials have properties that may make them suitable for many uses. Examples of such uses include high strength structural composites; sealing agents to effect metal-to-metal, metal-to-ceramic and ceramic-to-ceramic seals, including hermetic glass-to-metal electrical feed-through seals; and as sealing agent in microreactors and bioassay equipment. While various materials have been used as sealing agents, for example, epoxies and cements among others, improvements in this area are needed. The present invention discloses glass-ceramic materials that can be used as sealing materials, and also as high temperature coating, for metals and ceramics.

The present invention is directed to novel compositions suitable for forming glass-ceramic materials that may be used in a variety of applications. In particular, the glass-ceramic materials of the invention can be used as sealing agents and as high performance coating for metals, metal alloys and ceramics.

SUMMARY OF THE INVENTION

In one aspect the invention is directed to glass-ceramic materials containing silicon dioxide and one or more of the oxides of calcium, barium and strontium in a cyclosilicate crystal structure.

In a further aspect the invention is directed to glass-ceramic compositions comprising, in weight percent (wt. %):
  30-55% $SiO_2$,
  5-40% CaO,
  0-50% BaO,
  0.1-10% $Al_2O_3$, and
  0-40% SrO,
with the provision that the sum of CaO+BaO+SrO is in the range of 35-65 wt. %. In some embodiments the sum of CaO+BaO+SrO is in the range of 40-65 wt. %. The glass-ceramic composition has a glass phase and a crystalline phase. The crystalline phase has at least one cyclosilicate crystalline component selected from the group of walstromite, cyclo-wollastonite and $\mu$-(Ca,Sr)$SiO_3$, including solid solutions thereof. The glass ceramic may optionally further contain one or a plurality of additional crystalline components selected from the group of hardystonite, diopside and åkermanite.

In another aspect the invention is directed to compositions comprising, in weight percent, 30-55% $SiO_2$, 5-40% CaO, 0-50% BaO, 0.1-10% $Al_2O_3$, and 0-40% SrO, and optionally or further comprise greater than zero (>0) to the indicated maximum of least one oxide selected from the group consisting of
  >0-16% MgO, and
  >0-10% ZnO,
with the provision that the sum of CaO+BaO+SrO+MgO is in the range of 35-65 wt. %.

In a further aspect the invention is directed to compositions comprising, in weight percent, 30-55% $SiO_2$, 5-40% CaO, 0-50% BaO, 0.1-10% $Al_2O_3$, 0-40% SrO, and >0-16% MgO, and optionally further containing >0-10 wt. % of at least one metal oxide selected from the group of transition metal and rare earth metal oxides. Examples of the transition metal and rare earth metal oxides that can be used in practicing the invention include, without limitation, $Nb_2O_5$, $Ta_2O_5$, $Y_2O_3$, $Yb_2O_3$, $La_2O_3$, and $Fe_2O_3$.

In an additional aspect the invention is directed to glass-ceramic compositions that can be sintered at 900°-950° C. to produce a glass-ceramic with high crystallinity (that is, less than approximately 20% residual glass and preferably less than approximately 10% residual glass), low barium content (environmentally desirable), and an expansion coefficient (range: 25-700° C.) greater than $90 \times 10^{-7}/°$ C., said compositions comprising:
  38-50% $SiO_2$,
  20-40% CaO,
  0-20% BaO,
  2-6% $Al_2O_3$, and
  0-25% SrO,
with the provision that the sum of CaO+BaO+SrO is in the range of 35-65 wt. %. The glass-ceramic compositions have a glass phase and a crystalline phase. The crystalline phase has at least one cyclosilicate crystalline component selected from the group of walstromite, cyclo-wollastonite and $\mu$-(Ca,Sr)$SiO_3$, including solid solutions thereof. The glass ceramic may optionally further contain one or a plurality of additional crystalline components selected from the group of hardystonite, diopside and åkermanite.

In a further aspect the invention is directed to glass-ceramic compositions comprising 38-50% $SiO_2$, 20-40% CaO, 0-20% BaO, 2-6% $Al_2O_3$, and 0-25% SrO; and further or optionally comprise at least one oxide selected from the group of >0-16% MgO and >0-5 wt. % ZnO, with the provision that the sum of CaO+BaO+SrO+MgO or the sum of CaO+BaO+SrO+ZnO is in the range of 35-65 wt. %. In some embodiments of these compositions the sum of CaO+BaO+SrO+MgO or the sum of CaO+BaO+SrO+ZnO is in the range of 40-65 wt. %.

In a further aspect, the invention is directed to glass-ceramic compositions comprising 38-55 $SiO_2$, 20-40% CaO, 0-20% BaO, 2-6% $Al_2O_3$, 0-25% SrO, and >0-16% MgO, and may optionally further contain >0-10 wt. % of at least one metal oxide selected from the group of transition metal and rare earth metal oxides. The sum of CaO+BaO+SrO+MgO is in the range of 35-65 wt. %. In some embodiments of these compositions the sum of CaO+BaO+SrO+MgO is in the range of 40-65 wt. %. Examples of the transition metal and rare earth metal oxides that can be used in practicing the invention include, without limitation, $Nb_2O_5$, $Ta_2O_5$, $Y_2O_3$, $Yb_2O_3$, $La_2O_3$, and $Fe_2O_3$.

In another aspect the invention is directed to glass-ceramic compositions comprising, in weight percent:
45-55% $SiO_2$,
25-40% CaO,
0-25 wt. % SrO
3-6% $Al_2O_3$, and
4-15% MgO, with the provision that the sum of CaO+MgO or CaO+MgO+SrO is in the range 38-50 wt. %. The glass-ceramic compositions have a glass phase and a crystalline phase. The crystalline phase has at least one cyclosilicate crystalline component selected from the group of walstromite, cyclowollastonite and μ-(Ca,Sr)$SiO_3$, including solid solutions thereof. The glass ceramic may optionally further contain additional crystalline components selected from the group of hardystonite, diopside and åkermanite.

In another aspect, the invention is directed to glass-ceramic compositions comprising in weight percent 45-55% $SiO_2$, 25-40% CaO, 0-25% SrO, 3-6% $Al_2O_3$ and 4-15% MgO, and may optionally further contain >0-10 wt. % of at least one metal oxide selected from the group of transition metal and rare earth metal oxides. The sum of CaO+MgO or CaO+MgO+SrO is in the range 38-50 wt. %. Examples of the transition metal and rare earth metal oxides that can be used in practicing the invention include, without limitation, $Nb_2O_5$, $Ta_2O_5$, $Y_2O_3$, $Yb_2O_3$, $La_2O_3$, and $Fe_2O_3$.

In a further aspect the invention is directed to glass-ceramic compositions comprising in weight percent 45-55% $SiO_2$, 25-40% CaO, 0-25% SrO, 3-6% $Al_2O_3$ and 4-15% MgO, and may optionally further contain 4-8% ZnO. The sum of CaO+MgO or CaO+MgO+SrO is in the range 38-50 wt. %.

In an additional aspect the glass-ceramic compositions according to the invention have a coefficient of thermal expansion in the range of 85-115×$10^{-7}$/° C. Further, the glass-ceramic compositions according to the invention are stable to temperatures in the range of 1000-1450° C.

In yet another aspect of the invention, the highly crystalline glass-ceramic compositions of the invention have less than 20% residual glass. In preferred embodiments the glass-ceramic materials according to the invention have less then 10% residual glass.

DETAILED DESCRIPTION OF THE INVENTION

As used herein all compositional percentages are in weight percent (wt. %). In addition, the term "frit" as used herein means a powder, and particularly a powdered glass-ceramic precursor material/composition according to the invention. Further, as described herein, the glass-ceramics contain a glass phase and a crystalline phase. In addition, the crystalline phase contains at least one cyclosilicate component as described herein and may also contain additional crystalline components, either cyclosilicate or non-cyclosilicate (e.g., hardystonite, diopside, åkermanite), as also described herein.

Powder-processed (frit-sintered) glass-ceramics are useful as metal-to-metal, metal-to-ceramic, and ceramic-to-ceramic sealing materials as well as high-performance coatings for metals and ceramics. Compared with glasses, glass-ceramics offer higher use temperatures, superior mechanical properties and corrosion resistance, and a very wide range of thermal expansion coefficients (CTEs), which allow them to be used as expansion-matched seals for many different ceramics, metals and metal alloys. The ability to fill re-entrant angles and complex internal shapes by viscous flow of the molten glass during crystallization makes glass-ceramics particularly suited to applications where high strength of the system, and no leakage, are important. Highly crystalline glass-ceramic seals, with less than 20% residual glass (preferably less than 10% glass), are particularly well suited for sealing applications. The overall glass-ceramic seal can have a thermal expansion closely matched to that of the metal or ceramic substrate, and the glassy phase that remains in the final microstructure is confined to interstices and some grain boundaries, and does not form a continuous path through the seal.

In the present invention we have found that frit-sintered glass-ceramics based on cyclosilicate crystals in the $CaSiO_3$—$SrSiO_3$—$BaSiO_3$ phase field offer both high thermal expansion and high crystallinity. The crystal phases are solid solutions of (Ca, Sr, Ba)$SiO_3$ with complex crystal structures based on three-membered rings of $SiO_4$ tetrahedra.

Figure 1:
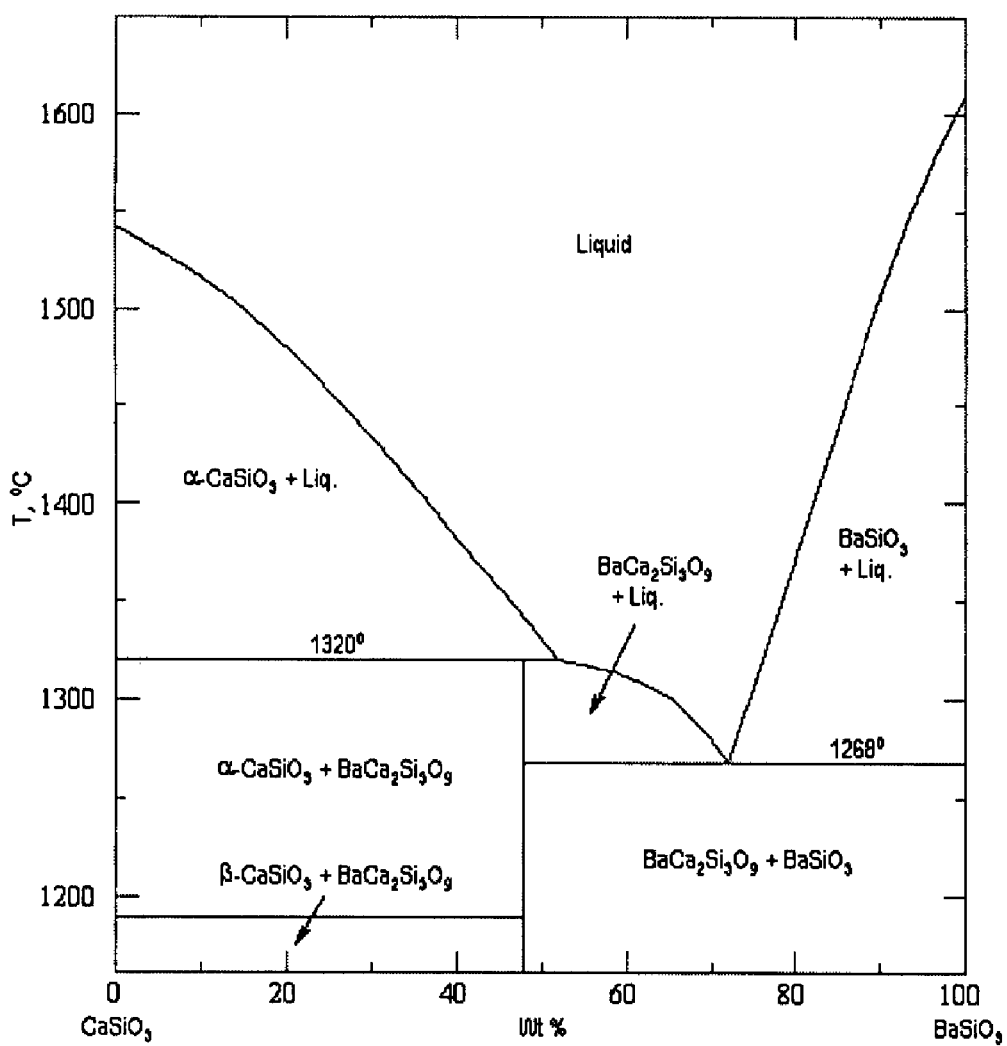
FIG. 1 is the binary phase equilibrium for $CASiO_3$—$BaSiO_3$.
Figure 2:
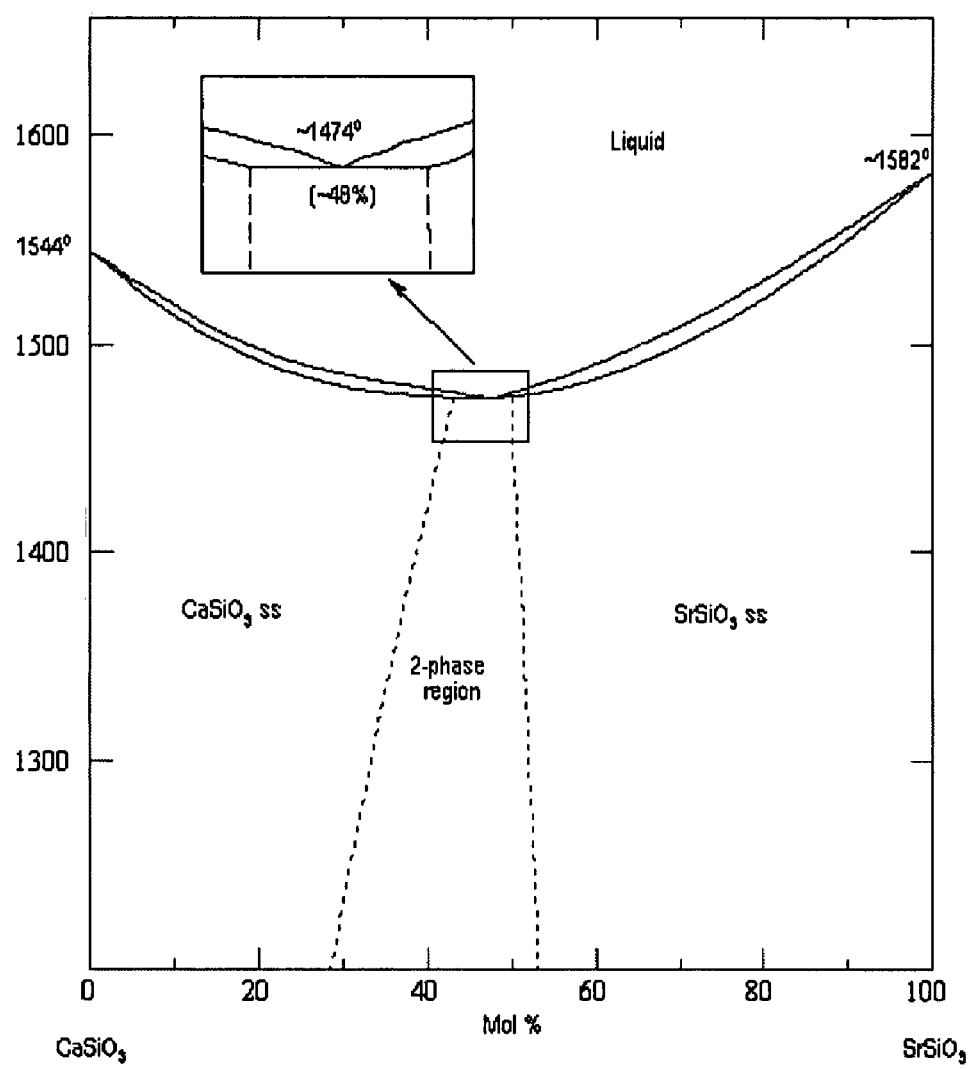
FIG. 2 is the binary phase equilibrium diagram for $CaSiO_3$—$SrSiO_3$.
Figure 3:
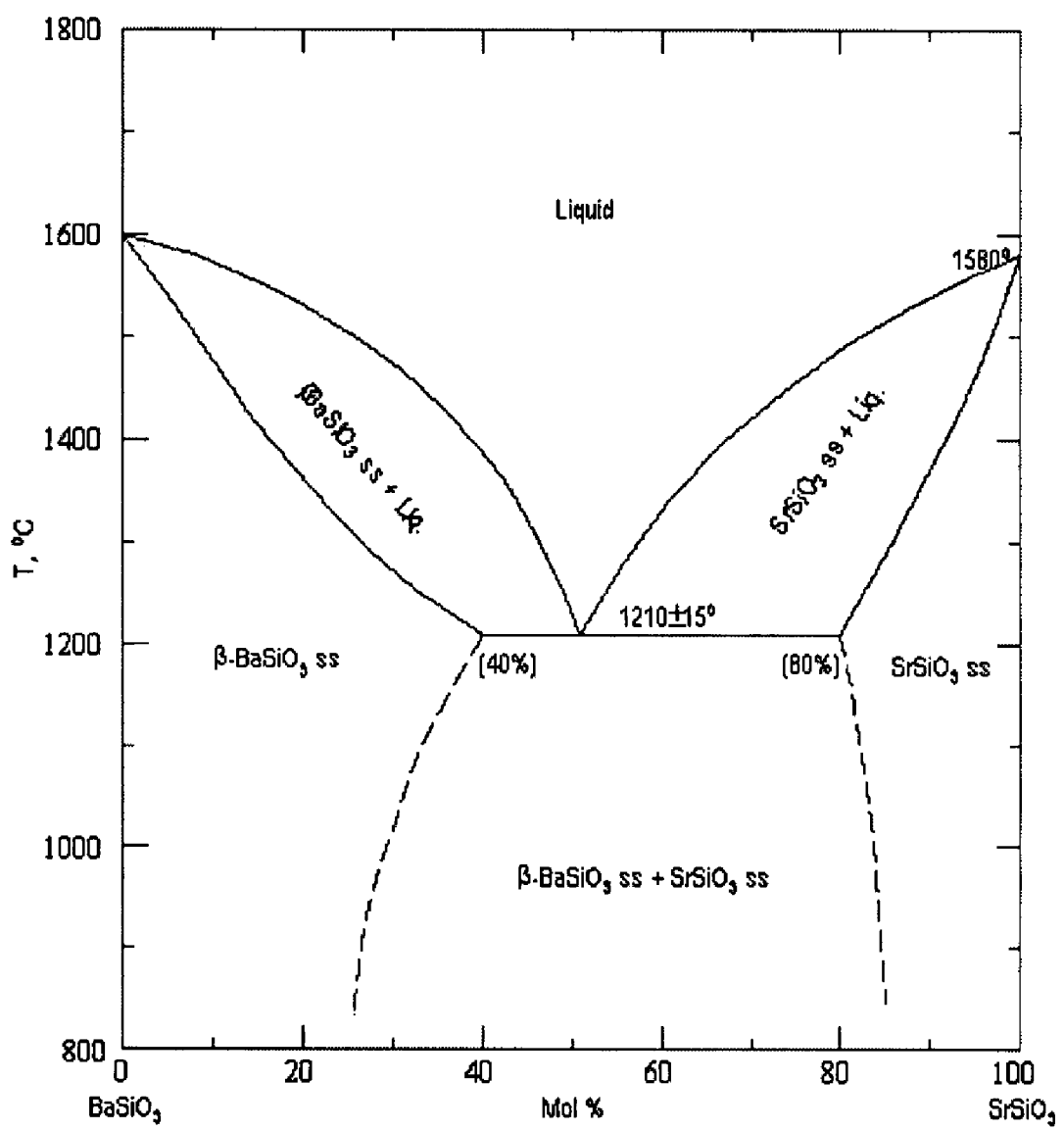
FIG. 3 is the binary phase equilibrium for $SrSiO_3$—$BaSiO_3$.
Figure 4:
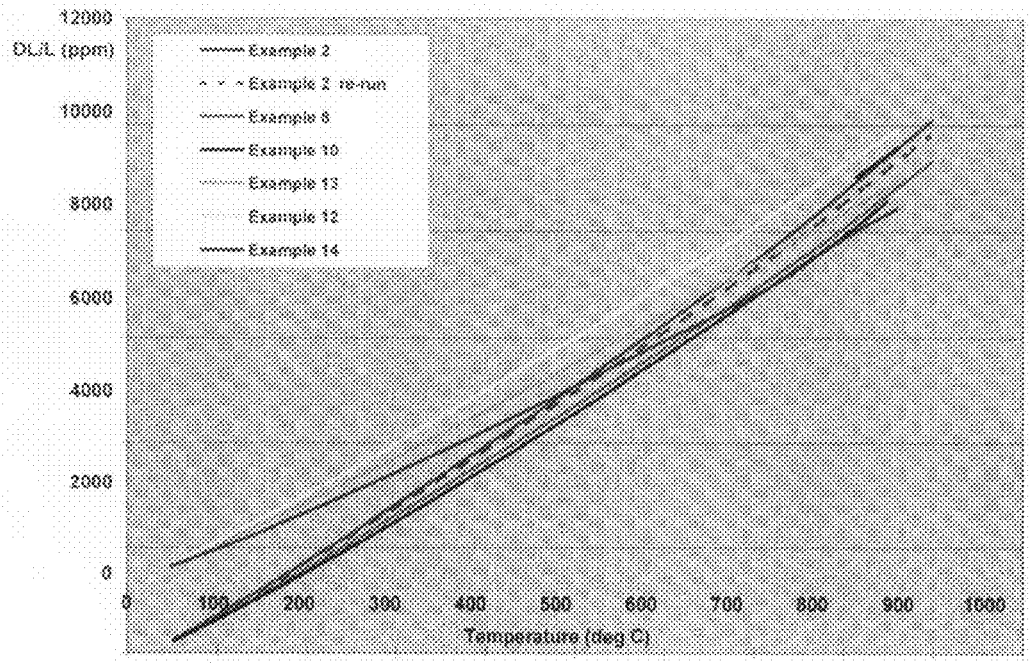
FIG. 4 illustrates the thermal expansion curves for cyclosilicate glass-ceramic compositions according to the invention shown as a plot of DL/L vs. T (° C.).

Each end member of the series ($CaSiO_3$, $SrSiO_3$, and $BaSiO_3$) exhibits several polymorphic forms, with the α-polymorph, or ring structure, being the higher-temperature form. As in many glass-ceramic systems, the higher-temperature form is readily obtainable (stabilized) in glass, even when the room-temperature polymorph is theoretically the equilibrium structure. FIGS. 2, 3 and 4 are binary phase equilibrium diagrams (obtained from *Phase Diagrams for Ceramists*, Ed. E. M. Levin, C. R. Robbins, and H. F. McMurdie (American Ceramic Society, Columbus, Ohio, 1964)) for $CaSiO_3$—$BaSiO_3$, $CaSiO_3$—$SrSiO_3$ and $SrSiO_3$—$BaSiO_3$, respectively. No known ternary phase equilibria have been published, although it is assumed that a great deal of solid solution exists. Based on X-ray diffraction data (shown below in Table 1), three distinct but structurally-related cyclosilicate phases are obtained in these glass-ceramics. These are:

(1) α-$CaSiO_3$ (also known as pseudo-wollastonite and cyclo-wollastonite),
(2) a phase known as "μ-$(Ca,Sr)SiO_3$", and
(3) walstromite (nominally $Ca_2BaSi_3O_9$ but there appears to be solid solution in this phase as well).

TABLE 1

| Phase | walstromite | cyclo-wollastonite | μ-(Ca,Sr)SiO$_3$ |
|---|---|---|---|
| Chemical formula | $(Ca_{0.67}Ba_{0.33})SiO_3$ | α-$CaSiO_3$ | $(Ca,Sr)SiO_3$ |
| Crystal form | Triclinic (Pseudohexagonal) | Triclinic (Pseudo-hexagonal) | "Hexagonal" (Pseudo-hexagonal?) |
| JCPDS card | 18-162 | 31-300 | 15-314 |
| Main XRD peaks | 2.99 | 3.24 | 2.94 |
|  | 6.58 | 3.22 | 3.06 |
|  | 2.70 | 1.97 | 2.63 |
|  | 4.40 | 3.42 | 3.18 |
|  | 3.35 | 2.82 | 5.06 |
|  | 5.07 | 2.45 | 2.21 |
|  | 3.20 | 5.67 | 3.53 |
|  | 3.06 | 5.93 | 2.99 |
|  | 2.61 | 5.06 | 2.57 |
|  |  | 4.37 |  |

While investigating these glass-ceramics to find suitable nucleating agents for bulk crystallization of the cyclosilicates of Table 1, it was noted that the stoichiometric glasses alone deformed and surface crystallized. These characteristics are exactly the properties desired in a devitrifying frit. Cyclosilicates also provide materials having high thermal expansion. For example, an internally-nucleated walstromite glass-ceramic was found to exhibit a CTE (25-400° C.) of >100×$10^{-7}$/° C., and the pseudowollastonite CTE has been reported as >90×$10^{-7}$/° C. The large amount of solid solution in these phases also allows for further tailoring of the CTE to match specific substrates. Moreover, because these compositions yield stable glasses at- or near-stoichiometry, "complete" crystallization would be expected.

While no prior art specifying glass-ceramics based on these crystal structures has been found, a publication by c. Lara et al., "*Glass-forming ability, sinterability and thermal properties in the systems RO—BaO—SiO$_2$ (R=Mg, Zn)*", Journal of Non-Crystalline Solids, 384 (2004), pages 149-155, describes sintered glass-ceramics in the system BaO—(Mg,Zn)O—SiO$_2$ that are stated to have a high thermal expansion in the range of 85-120×$10^{-7}$/° C. However, no crystal phases were identified and it is not known how much residual glass remains after crystallization in these materials.

U.S. Pat. No. 5,298,332 to J. F. MacDowell and R. L. Andrus (assigned to Corning Incorporated) discloses corrosion-resistant glass-ceramic coatings for titanium alloys. The composition range of materials claimed in U.S. Pat. No. 5,298,332 is 20-75 wt % total RO (R=alkaline earth metal ions Ca Ba and Sr), which oxides are selected in amounts not exceeding indicated proportions from the group consisting of up to 50% BaO, 55% SrO, and 35% CaO; 25-60% $SiO_2$; 0-25% MnO; 0-20% MgO; and 0-30% other compatible bivalent and trivalent oxides. Firing temperatures range from 800° C. to 1200° C. and the CTEs (measurement range unspecified) are in the range of 80-141×$10^{-7}$/° C.

The present invention is directed to highly crystalline frit-sintered glass-ceramics having a coefficient of thermal expansion in the range of 85-115×$10^{-7}$/° C. that are obtained by using the $CaSiO_3$—$SrSiO_3$—$BaSiO_3$ and $CaSiO_3$—$SrSiO_3$—$BaSiO_3$—$MgSiO_3$ systems described herein. The primary crystal phases possess cyclosilicate crystal structures. Potential uses for these materials include sealing frits for numerous applications in which the glass-ceramics' high expansion, lack of alkali ions and boron, refractory properties, and minimal residual glass could provide key differential advantages. The advantages of the materials of the present invention can be summarized as follows:

1. Chemical attributes: These materials are both alkali- and boron-free (important for many high-temperature uses) and can be environmentally "green" (the boron-free compositions).
2. Microstructure attributes: Zero or near-zero porosity and high crystallinity. Any residual glass in the material should occupy interstices and not form a continuous path through the bulk of the material. This latter feature is particularly valuable for minimizing cation migration through the glass phase at high temperature and thereby repressing any continuing reaction between the substrate and frit. This attribute would be of particular use for seals and coatings, which must survive many hours at high temperature.
3. Refractory: Many of these materials are stable up to, and even well beyond 1200° C.
4. Thermal expansion: The coefficient of thermal expansion for the materials of the invention can be tailored to match the coefficient of many metals, metal alloys and ceramics. Further, the materials according to the invention have linear (and identical) heating and cooling expansion curves. There is no hysteresis, no bend in curve. In addition, re-run samples provide identical expansion curves; the minimal residual glass of the compositions of the invention means there is no softening or permanent dimensional changes of the glass-ceramic part during thermal cycling—another potential advantage of the materials for use at high temperatures.

Glass compositions used for preparing the glass-ceramics according to the invention were prepared by melting the component materials in vessel, for example, a platinum crucible, at a temperature in the range of 1450-1650° C. for a time in the range of 2-5 hours. The starting materials may be the oxides, carbonates, nitrates, nitrites, hydroxides and form a of the metals described herein that are known in the art to be useful in the preparation of glasses. In some embodiments, the melts were carried out at a temperature of 1600±50° C. for a time in the range of 2.5-4 hours. For each composition, a small, approximately 5 cm piece was formed from the molten glass composition and was annealed at a temperature of 750±40° C. These samples served as visual indicators of the overall glass stability. The remainder of the glass in each crucible was drigaged into water and milled to a mean particle size in the range of 10-20 μm (325 mesh). The resulting frit (frit=powdered glass) powder was formed into an article (pellets, bars, rods, etc,) using techniques known in the art. For example, for the testing purposes described herein the frit was dry-pressed into 12.76 cm diameter (0.5 inch) pellets and/or 10×0.6×0.6 cm CTE bars (4×0.25×0.25 inches), and then fired (sintered) at temperatures in the range of 850° C. to 1000° C. for a time in the range of 1-2 hours.

The glass-ceramic compositions of the invention have a coefficient of thermal expansion in the range of 85-115×$10^{-7}$/° C. Further, the glass-ceramic compositions according to the invention are stable to temperatures >1000° C., many to temperatures in the range of 1200-1450° C.

A range of compositions in weight percent, phase assemblages, and CTEs for compositions according to the invention are given in Table 2. All of these compositions yield stable, colorless glasses upon melting. The properties listed are for dry-pressed samples fired at 950° C. for 1 hour. The primary (predominant) crystal phase in each sample has a cyclosilicate structure. The addition of MgO and ZnO yield secondary phases such as diopside $(Ca_{0.5}Mg_{0.5})SiO_3$ (a chain silicate), åkermanite $Ca_2MgSi_2O_7$, hardystonite $Ca_2ZnSi_2O_7$, and solid solutions between åkermanite and hardystonite $Ca_2(Mg,Zn)Si_2O_7$. In one embodiment the compositions according to the invention comprise, in weight percent (wt. %):

30-55% $SiO_2$,
5-40% CaO,
0-50% BaO,
0.1-10% $Al_2O_3$, and
0-40% SrO, with the provision that the sum of CaO+BaO+SrO is in the range of 35-65 wt. %. In some embodiments the sum of CaO+BaO+SrO is in the range of 40-65 wt. %

In another embodiment, the compositions according to the invention comprise, in weight percent (wt. %), 30-55% $SiO_2$, 5-40% CaO, 0-50% BaO, 0.1-10% $Al_2O_3$, and 0-40% SrO, and may optionally further contain greater than zero (>0) to the indicated maximum of least one oxide selected from the group consisting of:

>0-16% MgO, and
>0-10% ZnO, with the provision the sum of CaO+BaO+SrO+(MgO and/or ZnO) is in the range of 35-65 wt. %. In some embodiments the sum of CaO+BaO+SrO+(MgO and/or ZnO) is in the range of 40-65 wt. % [the phrase "MgO and/or ZnO" signifying that one or the other or both may be present]. Optionally, the foregoing compositions may also contain >0-10 wt. % of at least metal oxide selected from the group of transition metal and rare earth metal oxides. Examples of the transition metal and rare earth metal oxides that can be used in practicing the invention include, without limitation, $Nb_2O_5$, $Ta_2O_5$, $Y_2O_3$, $Yb_2O_3$, $La_2O_3$, and $Fe_2O_3$.

In a further embodiment of the invention, a preferred compositional range, for optimal sintering at 900°-950° C. with high crystallinity (that is, less than 20% residual glass and preferably less than 10% residual glass), low barium content (environmentally desirable), and expansion coefficient (range: 25-700° C.) greater than 90×$10^{-7}$/° C., comprises:

38-50% $SiO_2$,
20-40% CaO,
0-20% BaO,
2-6% $Al_2O_3$, and
0-25% SrO, with the provision that the sum of CaO+BaO+SrO is in the range of 35-65 wt. %. In some embodiments the sum of CaO+BaO+SrO is in the range of 40-65 wt. %.

In another embodiment, the compositions comprise 38-50% $SiO_2$, 20-40% CaO, 0-20% BaO, 2-6% $Al_2O_3$, and 0-25% SrO; and further or optionally comprises at least one oxide selected from the group of >0-16% MgO and >0-5 wt. % ZnO, with the provision that at least one of CaO+SrO+(MgO and/or ZnO) is in the range of 35-65 wt. %. In some embodiments the sum of CaO+SrO+(MgO and/or ZnO) is in the range of 40-65 wt. %. Optionally, the composition may also contain >0-10 wt. % of at least one metal oxide selected from the group of transition metal and rare earth metal oxides. Examples of the transition metal and rare earth metal oxides that can be used in practicing the invention include, without limitation, $Nb_2O_5$, $Ta_2O_5$, $Y_2O_3$, $Yb_2O_3$, $La_2O_3$, and $Fe_2O_3$.

In a further embodiment the compositions comprise 38-55% $SiO_2$, 20-40% CaO, 2-6% $Al_2O_3$, 0-25% SrO, and 4-15% MgO; and optionally the foregoing composition may also contain >0-10 wt. % of at least one metal oxide selected from the group consisting of $Nb_2O_5$, $Ta_2O_5$, $Y_2O_3$, $Yb_2O_3$, $La_2O_3$ and $Fe_2O_3$, with the provision that the sum of CaO+SrO+MgO is in the range of 35-65 wt. %. In some embodiments the sum of CaO+SrO+MgO is in the range of 40-65 wt. %, In yet another embodiment, the glass-ceramic compositions according to the invention comprise 45-55% $SiO_2$, 25-40% CaO, 3-6% $Al_2O_3$, 4-15% MgO, 0-25% SrO, with the provision that the sum of CaO+MgO or CaO+MgO+SrO is in the range of 38-50 wt. %. Optionally, the foregoing compositions may also contain >0-10 wt. % of at least one metal oxide selected from the group consisting of transition metal and rare earth metal oxides, with the provision that the sum of CaO+SrO+MgO is in the range of 35-65 wt. %. Examples of the transition metal and rare earth metal oxides that can be used in practicing the invention include, without limitation, $Nb_2O_5$, $Ta_2O_5$, $Y_2O_3$, $Yb_2O_3$, $La_2O_3$, and $Fe_2O_3$. In some embodiments the sum of CaO+SrO+MgO is in the range of 40-65 wt. %. Also optionally, the foregoing composition of 45-55% $SiO_2$, 25-40% CaO, 3-6% $Al_2O_3$, 4-15% MgO and 0-25% SrO may also contain 4-8 wt. % ZnO.

Examples of compositions according to the invention that can be used as sealing materials and/or high performance coatings are shown in Table 2

TABLE 2

| | Sample No. | | | | |
|---|---|---|---|---|---|
| | (1) | (2) | (3) | (4) | (5) |
| $SiO_2$ | 40.4 | 39.2 | 42.8 | 38.8 | 37.4 |
| $Al_2O_3$ | | 2.9 | | | 7.4 |
| CaO | 25.2 | 24.5 | 29.9 | 21.7 | 23.3 |
| SrO | | | | | |
| BaO | 34.4 | 33.4 | 27.3 | 39.5 | 31.9 |
| MgO | | | | | |
| ZnO | | | | | |
| $Nb_2O_5$ | | | | | |
| $Ta_2O_5$ | | | | | |
| $Y_2O_3$ | | | | | |
| $Fe_2O_3$ | | | | | |
| Base Cyclosilicate | $(Ca_{.67}Ba_{.33})$—$SiO_3$ | $(Ca_{.67}Ba_{.33})$—$SiO_3$ | $(Ca_{.75}Ba_{.25})$—$SiO_3$ | $(Ca_{.60}Ba_{.40})$—$SiO_3$ | $(Ca_{.67}Ba_{.33})$—$SiO_3$ |
| XRD | Walst s.s. | Walst s.s. | Walst s.s. | Walst s.s. | Walst. s s. + m. glass |
| CTE 25-700 | 102 | 100 | | | 105 |

| | Sample No. | | | | |
|---|---|---|---|---|---|
| | (6) | (7) | (8) | (9) | (10) |
| $SiO_2$ | 35.2 | 47.8 | 45.5 | 44.3 | 41.0 |
| $Al_2O_3$ | 4.8 | | 4.8 | 7.4 | 4.8 |
| CaO | 21.0 | 35.7 | 34.0 | 33.0 | 19.0 |
| SrO | | 16.5 | 15.7 | 15.3 | 35.2 |
| BaO | 38.0 | | | | |
| MgO | | | | | |
| ZnO | | | | | |
| $Nb_2O_5$ | | | | | |
| $Ta_2O_5$ | | | | | |
| $Y_2O_3$ | | | | | |
| $Fe_2O_3$ | | | | | |
| Base Cyclosilicate | $(Ca_{.50}Ba_{.50})$—$SiO_3$ | $(Ca_{.80}Sr_{.20})$—$SiO_3$ | $(Ca_{.80}Sr_{.20})$—$SiO_3$ | $(Ca_{.80}Sr_{.20})$—$SiO_3$ | $(Ca_{.50}Sr_{.50})$—$SiO_3$ |
| XRD | Walst. s.s. | Cyclowoll | Cyclowoll s.s. + μ s.s. | Cyclowoll + m. glass | μ s.s. + m. glass |
| CTE 25-700 | | | 102 | 102 | 100 |

Cyclowoll = Cyclo-wollastomite
Walst = Walstromite
Hardyston or hardy = Hardystonite
åker = åkermanite
μs.s. = μ-$(Ca,Sr)SiO_3$
diop = diopside
m = minor
s.s. = solid solution

| | Sample No. | | | | |
|---|---|---|---|---|---|
| | (11) | (12) | (13) | (14) | (15) |
| $SiO_2$ | 39.8 | 34.8 | 47.8 | 42.3 | 42.4 |
| $Al_2O_3$ | 74 | 4.8 | 4.8 | 7.1 | 3.8 |
| CaO | 18.5 | 10.9 | 27.2 | 31.6 | 29.3 |
| SrO | 34.3 | 20.0 | 12.6 | 14.6 | 7.9 |
| BaO | | 29.6 | | | 16.5 |
| MgO | | | 7.6 | | |
| ZnO | | | | 4.4 | |
| $Nb_2O_5$ | | | | | |
| $Ta_2O_5$ | | | | | |
| $Y_2O_3$ | | | | | |
| $Fe_2O_3$ | | | | | |
| Base Cyclosilicate | $(Ca_{.50}Sr_{.50})$—$SiO_3$ | $(Ca_{.33}Sr_{.33}$—$Ba_{.33})SiO_3$ | $(Ca_{.64}Sr_{.16}$—$Mg_{.20})SiO_3$ | $(Ca_{.80}Sr_{.20})$—$SiO_3$ + ZnO | $(Ca_{.73}Sr_{.10}$—$Ba_{.17})SiO_3$ |
| XRD | Cyclowoll + m. μs.s. + m. glass | Walst + μ s.s. + m. glass | Cyclowoll + diop + m. åker | Cyclowoll + hardy + glass | Walst + cyclowoll + m. glass |
| CTE 25-700 | | 106 | 95 | 86 | 108 |

| | Sample No. | | | | |
|---|---|---|---|---|---|
| | (16) | (17) | (18) | (19) | (20) |
| $SiO_2$ | 44.5 | 36.2 | 50.7 | 47.9 | 46.5 |
| $Al_2O_3$ | 3.8 | 4.8 | 4.8 | 4.8 | 4.8 |
| CaO | 32.3 | 21.0 | 37.5 | 36.7 | 36.4 |
| SrO | 12.7 | | | | |
| BaO | 6.6 | 38.1 | | | |

TABLE 2-continued

| | | | | | |
|---|---|---|---|---|---|
| MgO | | | 7.0 | 5.7 | 5.0 |
| ZnO | | | | 5.0 | 7.4 |
| $Nb_2O_5$ | | | | | |
| $Ta_2O_5$ | | | | | |
| $Ya_2O_3$ | | | | | |
| $Fe_2O_3$ | | | | | |
| Base Cyclosilicate | $(Ca_{.77}Sr_{.16}$—$Ba_{.07})SiO_3$ | | $(Ca_{.80}Mg_{.20})$—$SiO_3$ | | |
| XRD | Cyclowoll + m. Walst + m. | Walst s.s. + glass | Diopside + m. cyclowoll. | Cyclowoll + diop + hardy/åker | Hardyston. + m.diop + m. cyclwoll |
| CTE 25-700 | 111 | 104 | 99 | 103 | 97 |

Cyclowoll = cyclo-Wollastomite
Walst = Walstromite
Hardyston or hardy = hardystonite
åker = åkermanite
µs.s. = µ-(Ca,Sr)SiO$_3$
diop = diopside
m = minor
s.s. = solid solution

| | Sample No. | | | |
|---|---|---|---|---|
| | (21) | (22) | (23) | (24) |
| $SiO_2$ | 46.7 | 45.2 | 48.3 | 50.0 |
| $Al_2O_3$ | 4.7 | 4.5 | 4.8 | 4.7 |
| CaO | 26.6 | 25.8 | 27.5 | 37.0 |
| SrO | 12.3 | 11.9 | 12.7 | |
| BaO | | | | |
| MgO | 7.4 | 7.2 | 7.7 | 6.9 |
| ZnO | | | | |
| $Nb_2O_5$ | 2.3 | | | |
| $Ta_2O_5$ | | 5.4 | | 5.6 |
| $Y_2O_3$ | | | 3.9 | |
| $Fe_2O_3$ | | | | 0.5 |
| Base Cyclosilicate | $(Ca_{.64}Sr_{.16}$—$Mg_{.20})$—$SiO_3$ + $Nb_2O_5$ | $(Ca_{.64}Sr_{.16}$—$Mg_{.20})$—$SiO_3$ + $Ta_2O_5$ | $(Ca_{.64}Sr_{.16}$—$Mg_{.20})$—$SiO_3$ + $Y_2O_5$ | $(Ca_{.64}Sr_{.16}$—$Mg_{.20})$—$SiO_3$ + $Ta_2O_5$ + $Fe_2O_3$ |
| XRD | Cyclowoll + diop + m. åker | Cyclowoll + diop + m. åker | Cyclowoll + diop + m. åker | Cyclowoll + diop + m. åker |
| CTE 25-700 | 104 | 103 | 104 | |

Cyclowoll = cyclo-Wollastomite
Walst = Walstromite
Hardyston = hardystonite
åker = åkermanite
µs.s. = µ-(Ca,Sr)SiO$_3$
diop = diopside
m = minor
s.s. = solid solution While small amounts of alkalis and boric oxide can be added, these are unnecessary as well as undesirable for many applications. The addition of up to 10% $Al_2O_3$ helps stabilize the glass, delays crystallization until after some flow/sintering has taken place, and also promotes sintering at lower temperatures. However, as the amount of alumina increases, this results in more residual glass, particularly at temperatures below 1000° C. Consequently, the amount of alumina should be kept as low as possible. Higher-strontium compositions are the most refractory but require proportionately higher sintering temperatures. Up to 10% of other components such as transition metal oxides and/or rare earth metal oxides can also be added as sintering aids. It is preferable to add components that would not only promote sintering at lower temperatures, but would also partition into crystals (preferably high-expansion crystals) during the sintering/crystallization process, leaving only minimal residual glass. Examples of the transition metal and rare earth metal oxides that can be used in practicing the invention include, without limitation, $Nb_2O_5$, $Ta_2O_5$, $Y_2O_3$, $Yb_2O_3$, $La_2O_3$, and $Fe_2O_3$.

The frit compositions according to the invention as shown in Table 2 remain amorphous at 800° C., and most remain primarily amorphous at 850° C. Therefore, it can be preferable to first sinter at ~850° C. and then subsequently increase the temperature to >900° C. to effect crystallization. For some compositions, for example, pressed pellets held at 875° C. for 2 hours followed by a 10-minute temperature spike to 950° C., the XRD patterns are identical to those of pellets given the opposite treatment (that is, first a 950° C. temperature spike for 10 minutes followed by 2 hour hold at 875° C.), but are significantly tougher when subjected to hammer blows, which is an indication of improved sintering/flow prior to crystallization.

Figure 5:
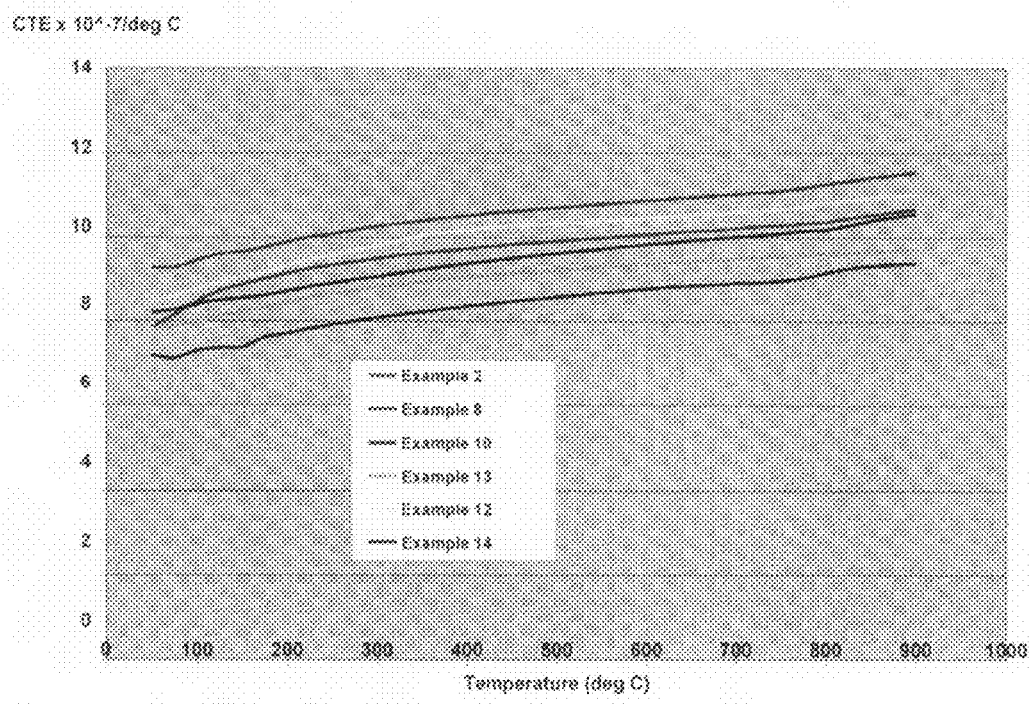
FIG. 5 illustrates the coefficient of thermal expansion (CTE) for cyclosilicate glass-ceramic compositions according to the invention shown as a plot of CTE×$10^{-7}$/° C. vs. T (° C.).

FIG. 5 shows representative thermal expansion curves for these cyclosilicate glass-ceramics. The plotted curves are the heating curves. The cooling curves (not illustrated) lie on top of (or mirror) the heating curves. The curve for a re-run sample (a glass-ceramic bar run through the CTE measurement twice) is shown as the dotted line in the ΔL/L plot. There is no difference between the curve for the re-run sample and the curve resulting from the initial measurements. The glass-ceramic compositions of the invention have a coefficient of thermal expansion in the range of $85\text{-}115 \times 10^{-7}/°$ C. Further, the glass-ceramic compositions according to the invention are stable to temperatures in the range of 1000-1400° C.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. Glass-ceramic compositions having at least one cyclosilicate crystalline component, said glass-ceramics comprising in weight percent (wt. %):
   30-55% $SiO_2$,
   5-40% CaO,
   0-50% BaO,
   0.1-10% $Al_2O_3$, and
   0-40% SrO,
wherein the sum of CaO+BaO+SrO is in the range of 35-65 wt. % and said glass-ceramic has a crystalline phase containing at least one cyclosilicate crystalline component, and
   wherein said compositions are boron-free.

2. The glass-ceramic according to claim 1, wherein said glass ceramic has a glass phase and a crystalline phase containing at least one cyclosilicate crystalline component selected from the group consisting of the walstromite, cyclo-wollastonite and $\mu$-$(Ca,Sr)SiO_3$.

3. The glass-ceramic compositions according to claim 1, wherein said glass-ceramic compositions further comprise at least one oxide selected from the group consisting of:
   >0-16 wt. % MgO, and
   >0-10 wt. % ZnO,
wherein the sum of CaO+BaO+SrO+MgO is in the range of 35-65 wt. %.

4. The glass-ceramic according to claim 3, wherein said glass ceramic has a glass phase and a crystalline phase containing at least one cyclosilicate crystalline component selected from the group consisting of the walstromite, cyclo-wollastonite and $\mu$-$(Ca,Sr)SiO_3$.

5. The glass ceramic compositions according to claim 1, wherein said glass-ceramic compositions >0-16 wt. % MgO and >0-10 wt. % of at least one metal oxide selected from the group consisting of transition metal and rare earth metal oxides.

6. The glass ceramic compositions according to claim 5, wherein said at least one metal oxide is a transition metal or rare earth metal oxide selected from the group consisting of $Nb_2O_5$, $Ta_2O_5$, $Y_2O_3$, $Yb_2O_3$, $La_2O_3$, and $Fe_2O_3$.

7. The glass-ceramic compositions according to claim 1, wherein said glass-ceramic have a coefficient of thermal expansion in the range of 85-115×$10^{-7}$/° C.

8. A glass-ceramic composition having at least one cyclosilicate crystalline component, said glass-ceramics comprising in weight percent (wt. %):
   38-50% $SiO_2$,
   20-40% CaO,
   0-20% BaO,
   2-6% $Al_2O_3$, and
   0-25% SrO,
wherein the sum of CaO+BaO+SrO is in the range of 35-65 wt. % and said glass-ceramic has a crystalline phase containing at least one cyclosilicate crystalline component and
   wherein said composition is boron free.

9. The glass ceramic-composition according to claim 8, wherein said glass-ceramic further comprises at least one oxide selected from the group of:
   >0-16 wt. % MgO and
   >0-5 wt. % ZnO,
therein the sum of CaO+BaO+SrO+MgO or CaO+BaO+SrO+ZnO is in the range of 35-65 wt. %.

10. The glass ceramic compositions according to claim 8, wherein said glass-ceramic compositions comprise >0-16 wt. % MgO, and >0-10 wt. % of at least one metal oxide selected from the group consisting of transition metal and rare earth metal oxides.

11. The glass ceramic compositions according to claim 10, wherein said at least one metal oxide is a transition metal or rare earth metal oxide selected from the group consisting of $Nb_2O_5$, $Ta_2O_5$, $Y_2O_3$, $Yb_2O_3$, $La_2O_3$, and $Fe_2O_3$.

12. The glass-ceramic compositions according to claim 8, wherein said glass-ceramics have a coefficient of thermal expansion in the range of 85-115×$10^{-7}$/° C.

13. A glass-ceramic composition having at least one cyclosilicate crystalline component, said glass-ceramic comprising
   45-55% $SiO_2$,
   25-40% CaO,
   0-25 wt. % SrO
   3-6% $Al_2O_3$, and
   4-15% MgO,
wherein the sum of CaO+MgO or CaO+MgO+SrO is in the range 38-50 wt. % and said glass-ceramic has a crystalline phase having at least one cyclosilicate crystalline component selected from the group consisting of the cyclosilicates walstromite, cyclo-wollastonite and $\mu$-$(Ca,Sr)SiO_3$ and
   wherein said composition is boron-free.

14. The glass-ceramic composition according to claim 13, wherein said composition further comprises 4-8 wt. % ZnO, wherein the sum of CaO+MgO is in the range of 38-50 wt. %.

15. The glass ceramic compositions according to claim 13, wherein said glass-ceramic compositions comprise >0-10 wt. % of at least one metal oxide selected from the group consisting of transition metal and rare earth metal oxides.

16. The glass ceramic compositions according to claim 15, wherein said at least one metal oxide is a transition metal or rare earth metal oxide selected from the group consisting of $Nb_2O_5$, $Ta_2O_5$, $Y_2O_3$, $Yb_2O_3$, $La_2O_3$, and $Fe_2O_3$.

17. The glass-ceramic composition according to claim 13, wherein the crystalline crystalline phase of said glass-ceramic further comprises at least one crystalline component selected from the group consisting of diopside, åkermanite, and hardystonite.

* * * * *